R. C. FORCE.
AUTOMATIC HOG WATERING TROUGH.
APPLICATION FILED MAR. 17, 1919.

1,363,242. Patented Dec. 28, 1920.

WITNESS
Wm G. Drew

INVENTOR
Raymond C. Force
BY Booth & Booth
ATTORNEYS

UNITED STATES PATENT OFFICE.

RAYMOND C. FORCE, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

AUTOMATIC HOG-WATERING TROUGH.

1,363,242.                Specification of Letters Patent.    Patented Dec. 28, 1920.

Application filed March 17, 1919. Serial No. 283,235.

*To all whom it may concern:*

Be it known that I, RAYMOND C. FORCE, a citizen of the United States, residing at Oakland, in the county of Alameda and State of California, have invented certain new and useful Improvements in Automatic Hog-Watering Troughs, of which the following is a specification.

My invention relates to watering-troughs, especially adapted for animals, such as hogs, which are prone to roughness and have a strong propensity to invade the trough, either through greed or for supposed convenience to partake of the contents or to wallow.

To meet these conditions the essentials are strength of the trough structure, its barrier-like and limiting shape, its sufficient capacity, and its automatic supply of water proportionate to consumption. These are the objects of my invention, and to this end my invention consists in the novel automatic hog-watering-trough which I shall hereinafter fully describe, by reference to the accompanying drawings in which—

The trough comprises essentially a relatively heavy cast iron base 1, to insure stability, and a relatively light sheet-metal barrier and limiting wall 2. In the most practical form the base is circular and the wall is cylindrical; but polygonal forms might be used, though with some disadvantages in manufacture and less economy in use.

The base 1 is formed with a raised rim 1' and an inner flange 3 concentric with its rim; and the wall 2 is secured to this rim as shown at 4, so that said wall, thus set, forms an annular space 5 for the water. The diameter of the wall is so proportioned to that of the base that the water space 5 has a width too small to permit the hogs getting into it and its circular form is prohibitive of any attempt to lie down in it; and moreover this form gives the maximum capacity for approach, due to the hogs assuming radial lines in partaking of the water.

Figure 1:
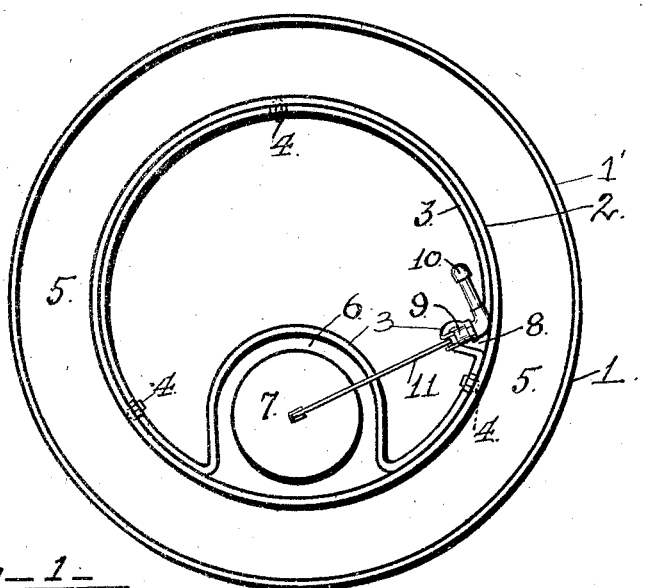
Figure 1 is a top plan of my trough.
Figure 2:
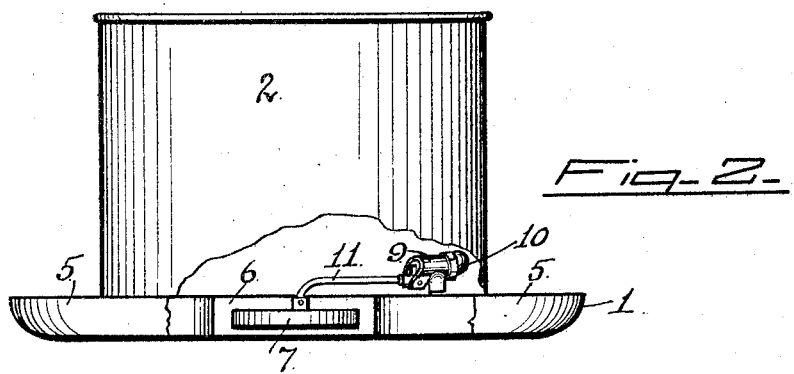
Fig. 2 is a broken elevation of the same.

The wall 2 is relatively high so that the hogs cannot surmount it. The top of the wall is open, as seen in Fig. 1, to enable the attendant to inspect the interior operative mechanism for the automatic water supply and to adjust or repair the same. The flange 3 of the base about which the wall is fitted, is at one portion indented to form a chamber 6 in which is a float 7. At another portion said flange is indented, as shown at 8, to form a supply chamber communicating with the trough space, and into which chamber a water connection in which is a controlling valve 9, discharges, said connection being supplied by a pipe 10 from a source of water, said pipe rising within the open space of the annular base casting. The float 7 is connected with the valve 9 by a lever arm 11. It will thus be seen that the automatic supply mechanism is fully housed within and protected by the wall 2.

The operation and use of the trough is as follows:—

As predetermined by the relation of the float to the inlet valve, the water will rise to a given level in the annular water space 5. The hogs will line up radially to said space. They cannot get into it, nor wallow in it, because of the barrier or limiting wall, nor can they dislodge or upset it, because of its inherent stability. As they drink, and the level of the water in the space 5 lowers, the float drops and by opening the valve admits more water, thereby keeping the supply automatically constant.

Figure 3:
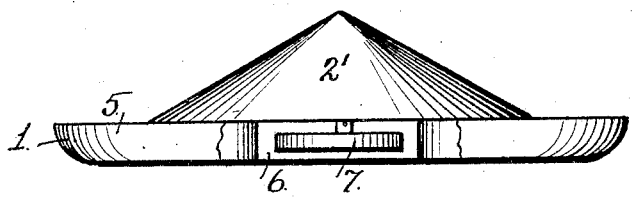
Fig. 3 is a broken elevation showing a modification in the shape of the barrier wall.

As shown in Fig. 3 the barrier wall may assume the form of a cone 2'. This form will house the water connections, but is not as efficient in keeping the hogs out of the water space, as the cylindrical form.

I claim:—

A hog-watering device of the character described comprising a heavy base portion of cast metal adapted to be self supporting upon the ground and bearing thereon over an extended area to prevent tipping under actions of the hog, said base having an outer rim portion projecting upwardly from its bottom and an inner flange portion also projecting upwardly from said bottom, the flange being spaced from the rim to coöperate with the intervening portion of the bottom in forming a trough therebetween, the flange at one portion being indented to form a float chamber and at a separate portion for a water supply, a valved water supply associated with the last mentioned indented portion adapted to feed to the trough; a float in the float chamber arranged to be influenced by the water in the trough, operative connections bridging the wall of the indented flanged portion of the float chamber and extending between the float and the valved water supply to control the latter from the float, a sheet metal barrier to prevent invasion of the trough by the hog, said barrier extending upwardly from the base flange and positioned with reference to said flange to leave a space between the lower edge of the barrier and the bottom of the trough constituting the communication between the trough and the float chamber, a portion of the barrier also occupying a plane outwardly beyond the edge of the float to house the same relative to the open portion of the trough, and means for securing the sheet metal barrier to the flange of the cast base.

In testimony whereof I have signed my name to this specification in the presence of two subscribing witnesses.

RAYMOND C. FORCE.

Witnesses:
S. A. FORD,
E. W. FRATERS.